United States Patent [19]

Upton et al.

[11] 4,020,888

[45] May 3, 1977

[54] RETRACTABLE AWNING

[75] Inventors: Albert E. Upton, Wichita, Kans.;
Donald S. McKee, Louisville, Colo.

[73] Assignee: The Scott & Fetzer Company, Lakewood, Ohio

[22] Filed: June 21, 1976

[21] Appl. No.: 697,777

[52] U.S. Cl. .............................. 160/66; 160/23 R; 135/5 AT

[51] Int. Cl.² ....................................... E04F 10/06

[58] Field of Search ............ 160/22, 23 R, 66, 67, 160/68; 135/5 AT; 248/273

[56] References Cited

UNITED STATES PATENTS

| | | | |
|---|---|---|---|
| 1,885,510 | 11/1932 | Chapman | 160/23 R |
| 2,788,791 | 4/1957 | Pospisil et al. | 135/5 AT |
| 3,001,577 | 9/1961 | Anderson | 160/67 |
| 3,324,869 | 6/1967 | Duda | 135/5 AT |
| 3,720,438 | 3/1973 | Johnson et al. | 135/5 AT |
| 3,722,571 | 3/1973 | Knight et al. | 135/5 AT |

Primary Examiner—Peter M. Caun
Attorney, Agent, or Firm—Gary M. Polumbus

[57] ABSTRACT

A retractable awning adapted to be mounted on a supporting surface and being movable between an extended position away from the supporting surface and a retracted position adjacent to the supporting surface includes a roll bar about which an awning sheet is selectively windable with the roll bar being rotatably disposed within an elongated tubular case. The case has an elongated bead projecting away therefrom adapted to be releasably retained in a mating groove provided in a mounting rail which is securable to the supporting surface. The case carrying the roll bar for the awning is, therefore, connected to the supporting surface by a tongue-in-groove connection. An auxiliary case is suspended from the main case and is adapted to releasably retain brace members which serve to retain the outer edge of the awning sheet in a position extended away from the supporting surface when the awning is in use.

3 Claims, 9 Drawing Figures

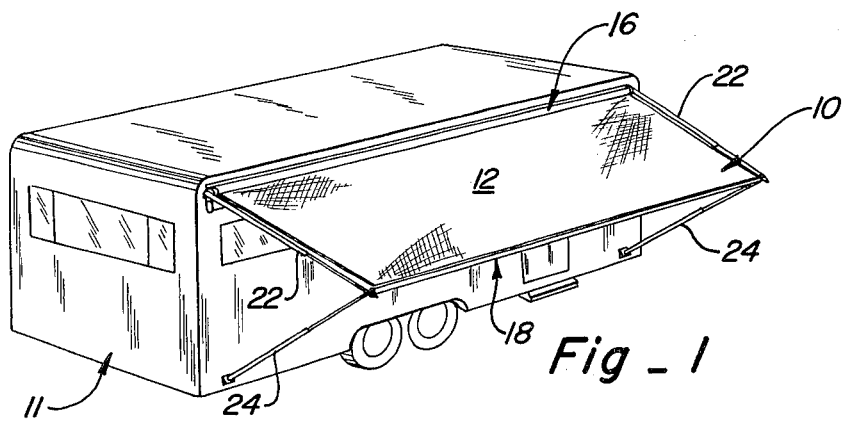
Fig_1
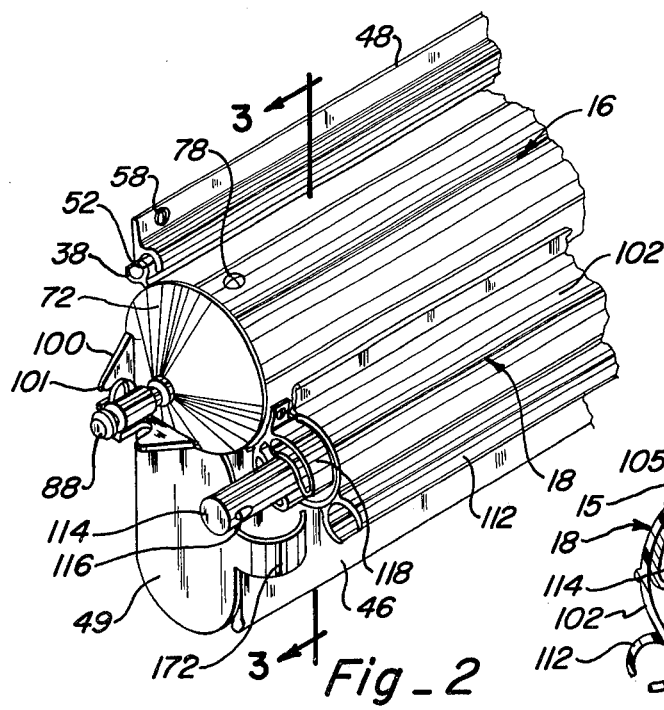
Fig_2
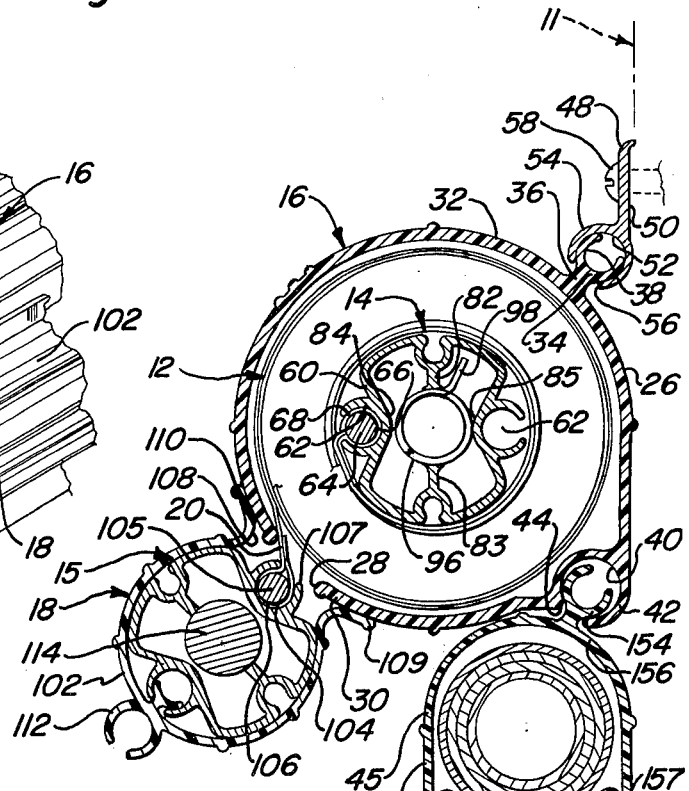
Fig_3
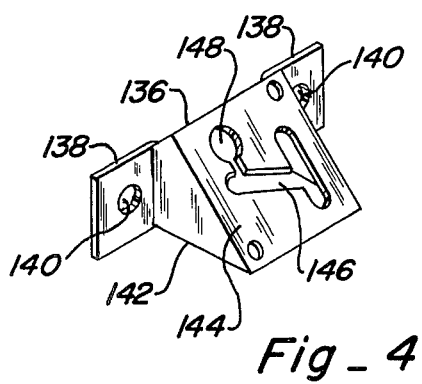
Fig_4

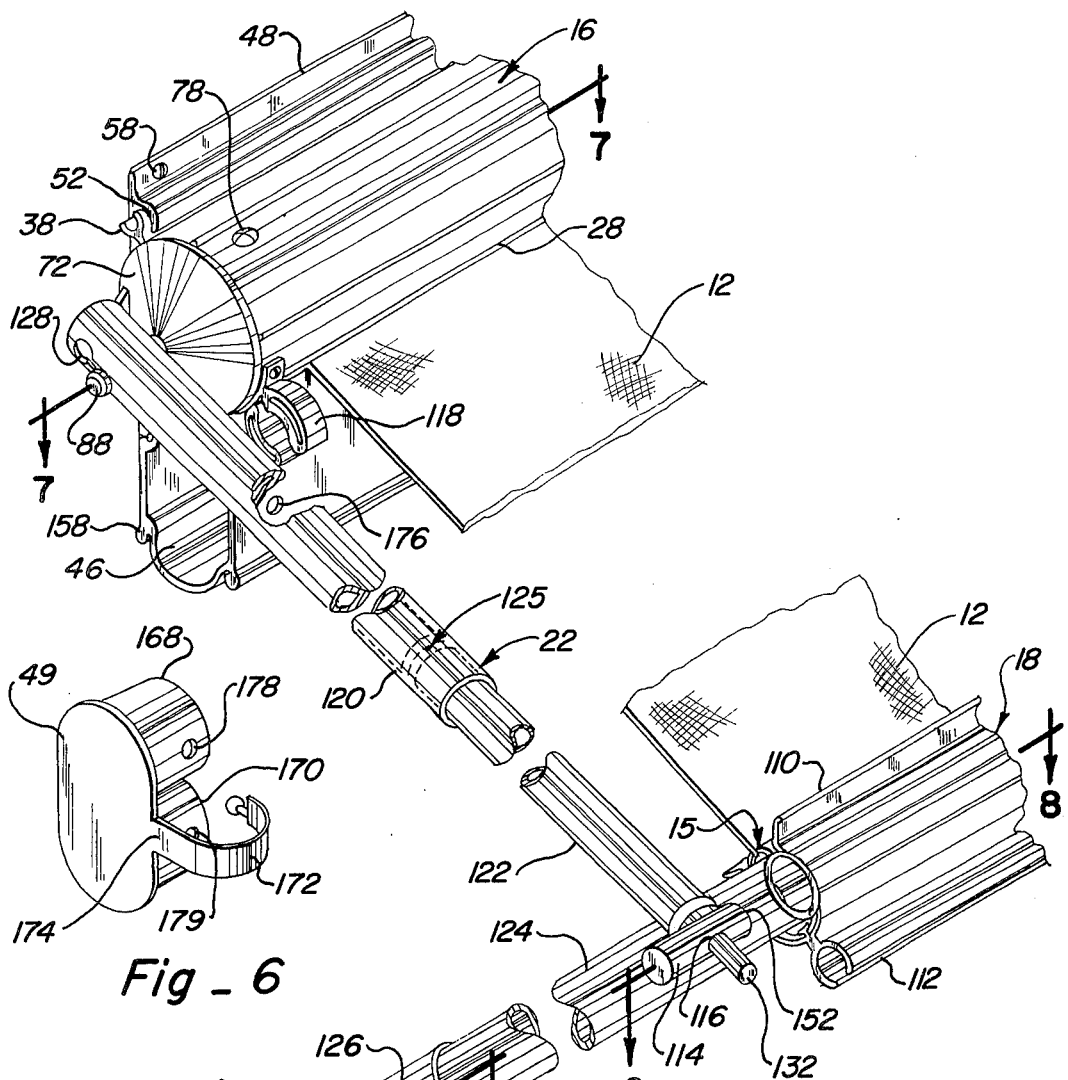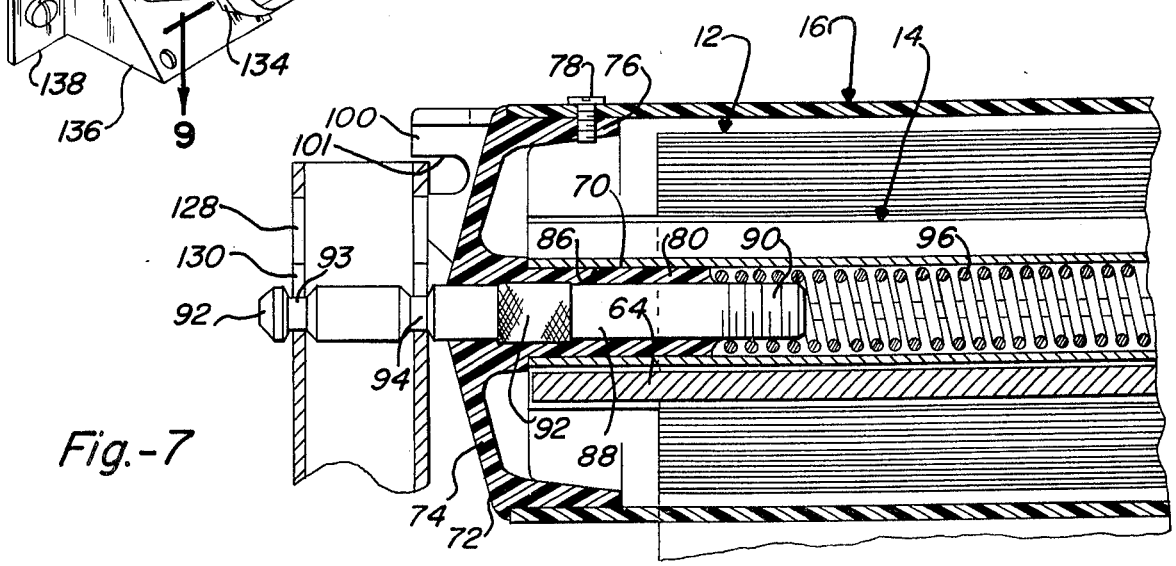

RETRACTABLE AWNING

BACKGROUND OF THE INVENTION

The present invention relates generally to awnings, and more particularly, to a retractable awning adapted to be mounted upon a supporting surface such as the side of a recreational vehicle, mobile home, or the like.

Awnings for sheltering windows, doors, patios, and the like have been in common use for many years. However, with the recent increase in popularity of recreational vehicles, mobile homes and the like, awnings to provide shelter adjacent the vehicle, mobile home, or the like, have been redesigned to be compatible with the mobile nature of the vehicles. Such awnings have been designed in such a way that the awnings are readily movable between a wind-resistant retracted position immediately adjacent the vehicle, where it remains during movement of the vehicle, and an extended position where an awning sheet projects away from the side of the vehicle providing shelter adjacent the vehicle. An example of such an awning is disclosed in U.S. Pat. No. 3,918,511 of Albert E. Upton, Jr., which is of common ownership with the present application.

While awnings of the type described in the aforementioned U.S. Pat. No. 3,918,511 have met with great commercial success, there is a large demand for a less sophisticated awning which can be manufactured in a less expensive way but yet which will operate reliably and in a simple manner. It is to satisfy this market demand that the present invention has been developed.

OBJECTS OF THE INVENTION

It is a primary object of the present invention to provide a new and improved retractable awning of simplified construction.

It is another object of the present invention to provide a new and improved retractable awning which is easily connectable to a supporting surface by a tongue-in-groove connection.

It is another object of the present invention to provide a new and improved retractable awning which is easily mountable on a supporting surface and has self-contained means for storing the component parts of the awning.

SUMMARY OF THE INVENTION

The retractable awning of the present invention is inexpensive to manufacture and is of simplified construction so as to be extremely reliable in repeated use.

The retractable awning includes an elongated generally cylindrical main case in which a roll bar is rotatably disposed with a sheet of awning material wrapped therearound. The roll bar is spring biased in a predetermined direction to bias the awning into a retracted position. An inner edge of the awning sheet is secured to the roll bar while an outer edge of the awning sheet protrudes through an elongated slot in the main case and is attached to a lead bar which can be pulled outwardly away from the main case to extend the awning sheet away from a supporting surface upon which the main case is mounted.

An auxiliary case is suspended from the main case and is adapted to removably store a pair of brace members which are utilized in the extended or use position of the awning to extend between the lead bar and brackets provided on the supporting surface beneath the main case to retain the awning in the extended position.

The main case is uniquely connected to a mounting rail on the supporting surface by a tongue-in-groove connection. In the preferred form of the invention, the tongue-in-groove connection includes an elongated bead integral with and extending along the length of the main case and a mating groove formed in and extending along the length of the mounting rail. The main case is easily connected to the mounting rail by sliding the bead axially in the groove until properly positioned.

Other objects, advantages and capabilities of the present invention will become more apparent as the description proceeds when taken in conjunction with the accompanying drawings.

BRIEF DESCRIPTION OF THE DRAWINGS

FIG. 1 is a perspective view of a house trailer having the awning of the present invention mounted thereon.

FIG. 2 is an enlarged fragmentary perspective view of one end of the awning of the present invention in a retracted position.

FIG. 3 is an enlarged section taken along line 3—3 of FIG. 2.

FIG. 4 is a perspective view of the bracket used to support the lower end of the braces of the awning of the present invention.

FIG. 5 is a perspective view of the awning of the present invention in an extended position with parts having been broken away for convenience.

FIG. 6 is a perspective view of the end cap of the auxilliary case used to store the brace members of the awning.

FIG. 7 is an enlarged longitudinal fragmentary section taken along line 7—7 of FIG. 5.

DESCRIPTION OF THE PREFERRED EMBODIMENT

Figure 8:
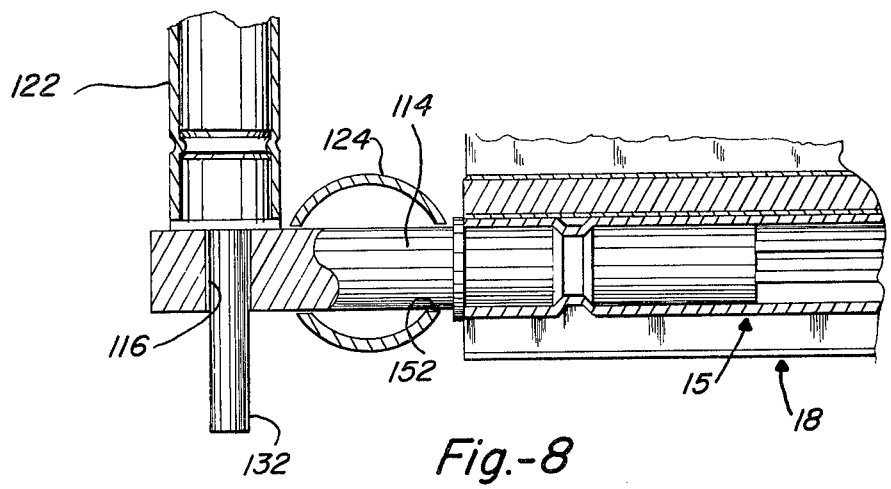
FIG. 8 is an enlarged section taken along line 8—8 of FIG. 5.
Figure 9:
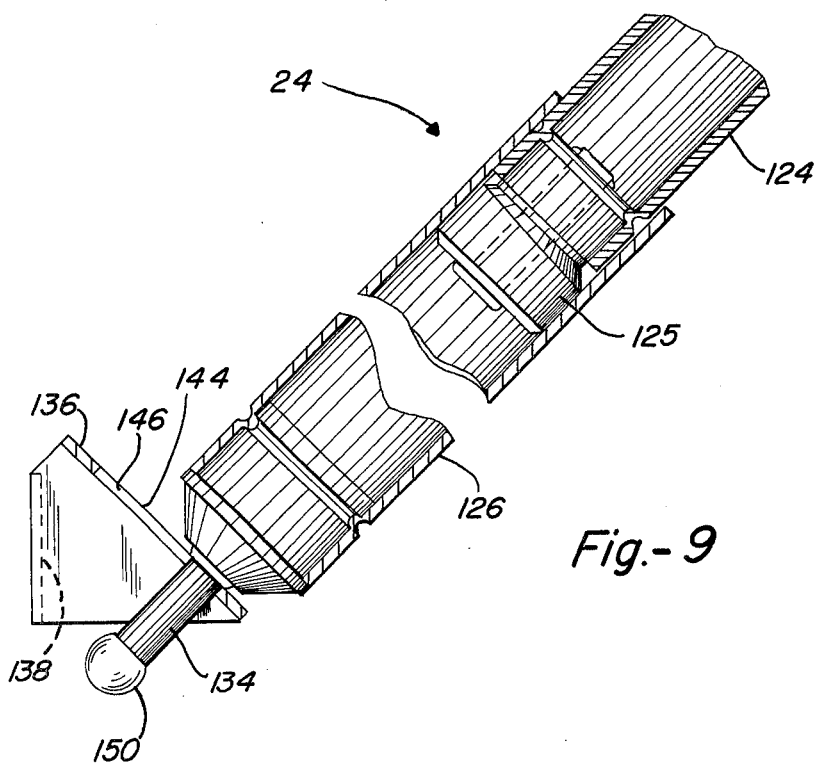
FIG. 9 is an enlarged section taken along line 9—9 of FIG. 5.

Referring first to FIG. 1, the retractable awning 10 of the present invention is shown mounted on the side of a house trailer 11 in an extended position. The awning 10 basically includes an awning sheet 12 which is windable about a roll bar 14 retained in an elongated cylindrical case 16 releasably connected to the side of the trailer 11 or other supporting surface, a lead bar 18 secured to a leading or outer edge 20 of the awning sheet 12, and a pair of brace members 22 and 24 adapted to retain the awning 10 in the extended position illustrated in FIG. 1.

The main case 16, which may be made of plastic, extruded aluminum, or the like, can be seen to have a generally circular cylindrical body having a relatively flat back wall 26. The case has an elongated slot 28 formed in the lower portion 30 of the curved front section of the case through which the awning sheet 12 projects. An upper section 32 of the case near the flat back wall 26 has a raised elongated head 34 extending therealong with the bead 34 including a neck portion 36 integral with the circular cylindrical body of the case 16 and a head portion 38 which is generally C-shaped in cross-section with the head being approximately three times the width of the neck 36. At the lower end of the back wall 26, the case 16 is provided with an elongated circular groove 40 defined by a curved wall 42 which is generally C-shaped in cross-section so as to define a narrow slot 44 communicating with the groove 40. The slot, as will be described in more detail later, is adapted to retain an auxiliary storage case 46 for the brace members 22 and 24.

The main case 16 is supported on the side wall of a vehicle 11 or other supporting surface by a mounting rail or track 48 which, as best seen in FIGS. 2 and 3, includes an elongated substantially planar back plate 50 having a groove 52 formed in the lower edge thereof defined by an elongated wall 54 of generally C-shaped cross-section. The wall 54 forms a relatively narrow slot 56 adapted to receive the neck 36 of the bead 34 on the main case 16 when the head of the bead on the main case is disposed within the groove. As is best seen in FIG. 3, the head of the bead on the main case conforms in external shape and size to the internal shape and size of the groove 52 on the mounting track 48 so that the bead 34 can be slid longitudinally into the groove 52 in a manner such that the main case 16 is supported by the mounting track 48. The back plate 50 of the mounting track 48 has spaced openings, not seen, therethrough. adapted to receive screw-type fasteners 58 which can be anchored in the supporting surface to positively secure the mounting track 48 to the surface.

As mentioned previously, the awning sheet 12, which may be made of vinyl or other suitable awning material, is windable about a roll bar 14 disposed within the main case 16. The roll bar 14 which may be of the type shown in co-pending application Ser. No. 635,798, which is of common ownership with the subject application, is an elongated extruded bar 60 having a plurality of elongated grooves 62 circumferentially spaced therearound, one of which can be used to anchor the inner edge 66 of the awning sheet 12. In the embodiment shown, the inner edge 66 of the awning sheet 12 is looped and is retained in a groove 62 of the roll bar 14 with a retention rod 64 which slides within the loop 68 and within the groove 62 so that the awning sheet cannot be pulled out of the groove 62 unless it is slid axially of the bar.

The roll bar 14 is supported within the main case 16 by bearing 70 provided on end caps 72 which are secured in opposite ends of the main case 16. The end caps 72 are probably best illustrated in FIG. 7 to have a generally conical wall 74 with an inwardly directed generally cylindrical flange 76 around the perimeter which is adapted to fit snugly within an end of the main case 16. Each end cap 72 is securable in an end of the main case 16 by screw-type fasteners 78 extending through the main case 16 into the flange 76 at spaced locations around the main case. The bearing portion 70 of the end caps 72 is defined by a cylindrical wall 80 extending inwardly into the main case 16 in concentric relationship with the flange 80 and so that the bearing 70 is concentric with the longitudinal central axis of the main case.

As best seen in FIG. 3, the roll bar 14 is substantially hollow but has two inwardly directed ribs 82 and 83 disposed in opposition to each other and two inwardly directed angulated walls 84 and 85 also disposed in opposition to each other and displaced 90° from the ribs so that the angulated walls 84 and 85 and ribs 82 and 83 define supporting surfaces to engage the bearing 70 on an associated end cap 72 to thereby rotatably support the roll bar 14 on the end cap 72.

As best seen in FIG. 7, the end cap has a central cylindrical opening 86 therethrough which is adapted to receive an elongated cylindrical pin 88 having a threaded inner end 90, a knurled intermediate portion 92 and an outer end 93 having a pair of circular grooves 93 and 94 therein to rotatably receive the inner end of an upper brace member 22 as will be described later. The knurled intermediate portion 92, of the pin 88 serves to secure the pin within the end cap 72 while the threaded inner end 90 of the pin 88 snuggly receives the end of a coil spring 96 disposed within the roll bar 14. There is a coil spring 96 at each end of the roll bar 14 disposed on the inner threaded end 90 of the pin 88 at the associated end of the roll bar 14 and each coil spring 96 has a tang 98, FIG. 3, protruding radially away therefrom which engages an inner surface of the roll bar 14 and thereby causes the coil spring 96 to be tensioned when the roll bar 14 is rotated thereabout as when the awning sheet 12 is pulled from the retracted position of FIG. 3 to the extended position of FIG. 1. As will be appreciated, as the spring 96 is tensioned, it grips the threaded end 90 of the pin 89 even more firmly assuring that the spring 96 does not slip on the pin 88. The awning sheet 12 is thus always biased into its retracted position of FIG. 3.

As best seen in FIG. 7, the end caps 72 also include a pair of mutually perpendicular flanges 100 protruding outwardly from the conical wall 74 thereof with each flange having a slot 101 therein so that a screw-type fastener can be extended through the slot 101 of one of the flanges into the supporting surface of the vehicle 11 or the like and prevent axial sliding movement of the case 16 relative to the supporting surface.

In the preferred embodiment, the lead bar 18 includes a central elongated member 15 identical to the roll bar 14 with the central member having a case 102 therearound made of plastic or extruded aluminum. The outer edge of the awning sheet 104 is secured to the lead bar 18 in the same manner in which the inner edge 66 of the awning sheet 12 is secured to the roll bar 14, that is, with an elongated rod 105 inserted through a loop 106 in the outer edge 104 of the awning sheet 12 and received in a groove 107 provided in the lead bar 15. The case 102 around the lead bar 15 is of generally cylindrical configuration with an opening 108 provided along one side defined by out-turned flanges 109 and 110 which are adapted to abut the main case 16 on opposite sides of the slot 28 provided therein for the awning sheet. In this manner, when the awning 12 is in the retracted position of FIG. 3, the slot 28 in the main case 16 is lined on both sides by the flanges 109 and 110 on the lead bar case 102 which are abutted against the main case 16. The case 102 for the lead bar 18 also has a generally circular groove 112 provided on an external surface thereof which is adapted to support a valance (not shown) or other decorative or utilitarian sheet, and such valance would be connected to the case 102 as by an elongated rod extending through a loop along an edge of the valance with the rod and loop being inserted in the circular groove 112. the lead bar 115 has a pin 114 inserted in each end thereof which protrudes outwardly for connection to the brace members 22 and 24. This pin 114 is retained in the lead bar 15 in any suitable manner and has a transverse opening 116 therethrough near its outermost end.

As best seen in FIG. 2, the main case 16 has a C-shaped clip 118 mounted on each end thereof which are adapted to releasably receive an associated pin 114 protruding from an associated end of the lead bar 15 when the awning is in the retracted position so that the lead bar 15 is positively retained in contiguous relationship with the main case 16 when the awning 12 is not in use.

There is an upper 22 and lower 24 brace member at each end of the awning 10 and each of the brace members consists of two telescoping parts 120, 122 and 124, 126 respectively, so that the brace members can be extended when in a use condition and retracted when not in use. The braces 22 and 24 shown in the present disclosure are provided with conventional twist-lock mechanisms 125 to secure the telescoping members and prevent relative axial movement when desired.

Looking first at the upper brace member 22, it can be seen that on its inner end 120 it is provided with a slot 128 adapted to receive an associated pin 88 protruding from the end of the roll bar 14 and the pin 88 is designed to stay in the slot 128 in a conventional manner by providing a relatively narrow portion 130 to receive the circular grooves in the pin 88. The opposite or outer end 122 of the upper brace member 22 has a reduced diameter axial extension 132 which is adapted to slideably fit into the transverse passage 116 provided in the pin 114 projecting from the associated end of the lead bar 15. As will be appreciated, since the coil spring 96 in the roll bar 14 biases the awning into its retracted position, the spring 96 also serves to retain the upper brace member 22 in the position illustrated in FIG. 5 by retaining the pin 88 projecting from the end of the roll bar 14 in the narrow portion of the slot 128 in the upper brace member 120.

The lower brace member 24 is provided with a reduced diameter axial extension 134 on its inner end 126 which is adapted to be releasably connected to a bracket 136, FIG. 5, secured to the supporting surface. As can be seen in FIG. 5, the bracket 136 has a pair of flanges 138 with openings 140 therein to receive screw-type fasteners which are adapted to secure the bracket to the supporting surface and an outwardly projecting body 142 having an inclined wall 144 with a series of cooperating slots 146 therein adapted to retain the inner end 134 of the lower brace member 126. As can be appreciated, the system of slots 146 in the bracket 136 includes one with a circular opening 148 therein through which a spherical head 150 on the end of the axial extension 134 can be inserted with two other slots 146 cooperating with the slot 146 in which the circular opening 148 is provided to guide the axial extension 134 away from the circular opening 148 wherein it can be selectively retained until it is desired to release the lower brace member 126 from the bracket 136. The outer end of the lower brace member 124 has a transverse passage 152 therethrough which is adapted to receive the pin 114 projecting from the associated end of the lead bar 15, and as is best seen in FIG. 5, the outer end of the lower brace member 124 is placed on the pin 114 of the lead bar 15 prior to the upper brace member 122 being connected thereto so that the upper brace member 22 will retain the lower brace member 24 on the lead bar 15.

An auxiliary case 46 is provided to store the brace members 22 and 24 when they are not in use and the auxiliary case 46 is of generally oval cylindrical configuration having an elongated bead 154 identical to the bead 34 on the main case member 16 near the rearward portion 156 of the upper surface thereof so that this bead 154 can be slid into the groove 40 provided at the bottom of the back wall 26 of the main case 16 to suspend the auxiliary case 46 from the main case 16 adjacent to the supporting surface. In the disclosed form, the auxiliary case 46 is made from two generally U-shaped extruded elements 45 and 47 which are connected by tongue-in-groove connectors 157 to form the oval cylindrical configuration. An enlarged bead 158 is provided along the front and back lower edges of the auxiliary case, with the bead along the back lower edge cooperating with a retension rail 160 so that the auxiliary case 46 can be secured to the supporting surface and will not flop around during movement of the vehicle 11 or other supporting surface upon which the awning 10 is mounted. The retension rail 160, as can be seen, has a generally flat planar portion 162 through which screw-type fasteners 164 can pass into the supporting surface and an arcuate extension portion 166 adapted to extend partially around the bead 158 to retain the lower edge of the auxiliary case 46.

A pair of end caps 49 of the type shown in FIG. 6 are provided to close the ends of the auxiliary case 46 to retain the brace members 22 and 24 therewithin. As will be appreciated, each end cap includes two cylindrical protrusions 160 and 170 adapted to extend into the auxiliary case 46 in alignment with the brace members retained therein and a strap 172 which extends from a base portion 174 of the end cap 49 and is adapted to be inserted through an opening 176 in the side wall of the auxiliary case 46 and snapped into one of two apertures 178 and 179 provided on the cylindrical extensions of the cap 49 so that the cap 49 is positively retained on the auxiliary case 46. The auxiliary case 46, of course, is designed so that the brace members 22 and 24 when telescopically retracted can be inserted into the case 46 in overlying relationship and in abutting longitudinally aligned relationship with corresponding brace members for the opposite end of the awning so that the auxiliary case 46 retains all four brace members utilized with the awning 10.

Although the present invention has been described with a certain degree of particularity, it is understood that the present disclosure has been made by way of example and that changes in details of structure may be made without departing from the spirit thereof.

What I claim is:

1. A retractable awning adapted to be attached to a supporting surface and being movable between extended and retracted positions comprising in combination:
    a roll bar,
    a sheet of awning material anchored along an inner edge to said roll bar and adapted to be wound about the roll bar when the awning is retracted,
    a case rotatably supporting the roll bar therewithin,
    a mounting rail securable to said supporting surface, said mounting rail and case including connecting elements defining means for a releasable tongue-in-groove connection between the case and the mounting rail,
    brace members selectively positionable between the roll bar and said supporting surface to hold the awning in the extended position, and
    an auxiliary case adapted to store said brace members, and tongue-in-groove connection means connecting said auxiliary case to the first mentioned case.

2. The awning of claim 1 wherein said auxiliary case is elongated and when connected to said first mentioned case extends immediately beneath the first mentioned case in parallel relationship therewith.

3. A retractable awning adapted to be attached to a supporting surface and being movable between extended and retracted positions comprising in combination:

a roll bar, a sheet of awning material anchored along an inner edge to said roll bar and adapted to be wound about the roll bar when the awning is retracted, a case rotatably supporting the roll bar therewithin, said case having an elongated slot therein through which the awning sheet projects and wherein an outer edge of said awning sheet projects outwardly through said slot, a case rotatably supporting the roll bar therewithin, a mounting rail securable to said supporting surface, said mounting rail and case including connecting elements defining means for a releasable tongue-in-groove connection between the case and the mounting rail, brace members selectively positionable between the roll bar and said supporting surface to hold the awning in the extended position, a lead bar connected to said outer edge of the awning sheet, said lead bar having connection means at opposite ends thereof to releasably receive one end of an associated brace member, connection means on said case at opposite ends thereof to releasably connect the lead bar to the case when the awning is in the retracted position, and a second case in which said lead bar is disposed, said second case having means thereon for abutting the first mentioned case on opposite sides of said slot in the first mentioned case when the lead bar is releasably connected to the first mentioned case.

* * * * *